No. 775,870.  
Patented November 22, 1904.

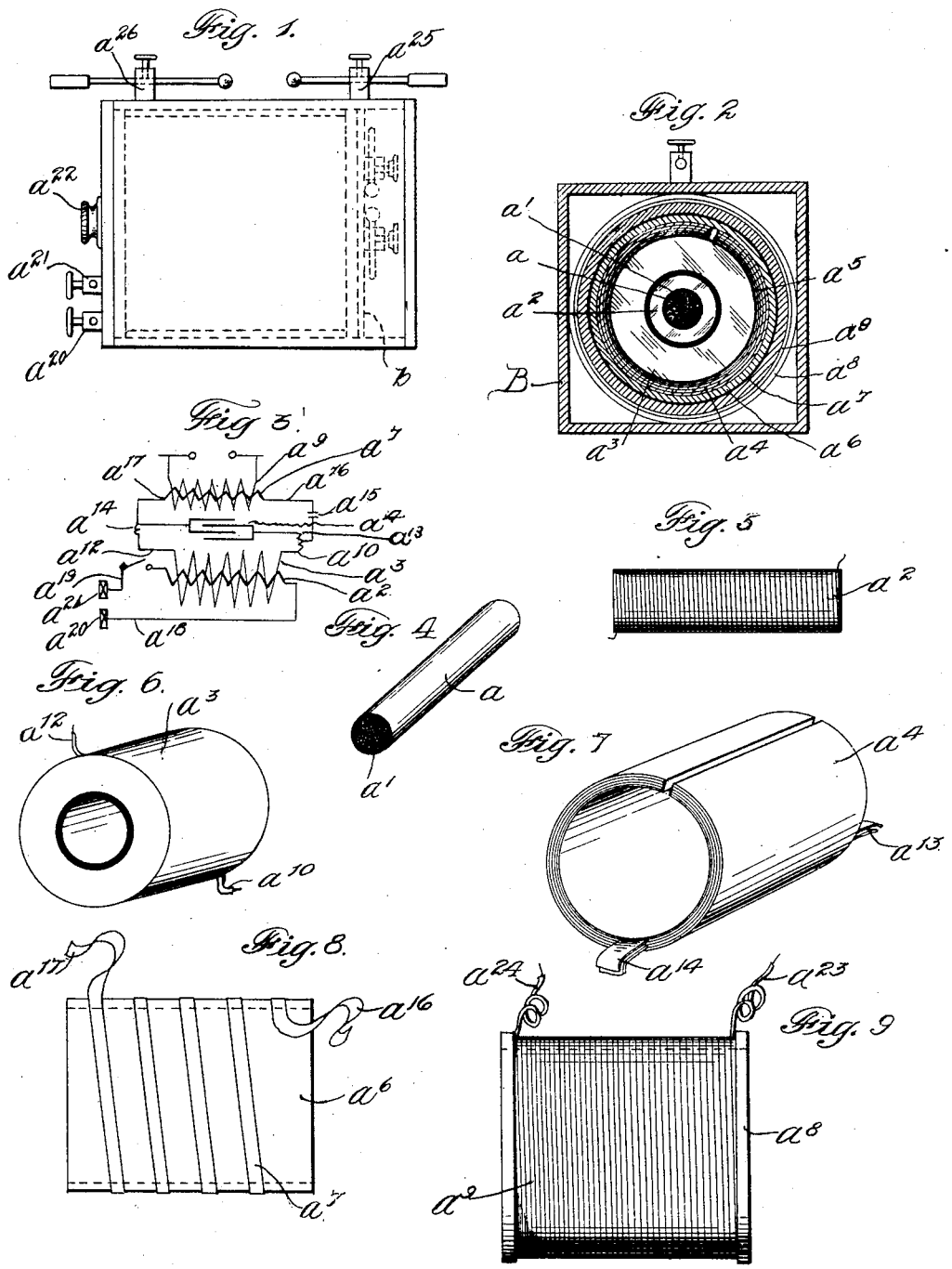

UNITED STATES PATENT OFFICE.

FREDERICK F. STRONG, OF BOSTON, MASSACHUSETTS.

PORTABLE HIGH-FREQUENCY APPARATUS.

SPECIFICATION forming part of Letters Patent No. 775,870, dated November 22, 1904.

Application filed May 23, 1904. Serial No. 209,298. (No model.)

*To all whom it may concern:*

Be it known that I, FREDERICK F. STRONG, a citizen of the United States, and a resident of Boston, in the Commonwealth of Massachusetts, have invented an Improvement in Portable High-Frequency Apparatus, of which the following description, in connection with the accompanying drawings, is a specification, like letters on the drawings representing like parts.

My present invention has for its object the production of an exceedingly compact and small high-frequency apparatus for the convenience of physicians for emergency practice, and on account of its size I term it "The Midget" portable high-frequency apparatus, and I have succeeded in condensing all the essential parts into a space within four inches wide, four inches high, and five inches long.

The constructional details of my invention will be pointed out in the following description, referring to the accompanying drawings for a clearer understanding thereof.

In the drawings, Figure 1 represents the complete apparatus in side elevation. Fig. 2 is a central cross-sectional view thereof. Fig. 3 is a diagrammatic view for the purpose of showing the wiring. Fig. 4 is a perspective detail of the central core and its inclosing insulation. Fig. 5 is a side elevation of the primary which surrounds the core. Figs. 6 and 7 are perspective views of the secondary of the transformer and of the condenser. Figs. 8 and 9 are views in side elevation of the primary and secondary of the inductor or high-frequency coil.

I have found that by arranging the parts as hereinafter explained I can produce a very efficient apparatus having all its parts arranged concentrically.

I first fill a paper tube $a$ with iron wires $a'$, making a laminated core, and on this tube I wind a primary of relatively coarse wire, as indicated at $a^2$. I then wind a secondary $a^3$ of many turns of fine wire, having an axial opening enabling it to slip tightly over the primary $a^2$, and on this I wrap a condenser $a^4$, originally composed of flat sheets of mica capable of being bent round into circular form, as shown in Fig. 7. The inside sheet of the condenser serves as sufficient insulation; but, if desired, an additional sheet of insulation may be used, as indicated at $a^5$, Fig. 2. I form a micanite tube $a^6$ to slip tightly over the condenser, and on this tube I wind a coarse primary $a^7$ of a high-frequency coil, said primary preferably consisting of a thin copper strip whose turns are insulated from each other. Over this primary I slip a heavy micanite tube or spool $a^8$, on which is wound a single layer of fine insulated secondary $a^9$.

Having assembled the parts in the order stated, I connect the terminals as shown in Fig. 3, where it will be seen that the opposite terminals $a^{10}$ $a^{12}$ of the secondary $a^3$ connect, respectively, to the opposite terminals $a^{13}$ $a^{14}$ of the condenser $a^4$, said terminals $a^{10}$ $a^{13}$ being connected to one post of a spark-gap $a^{15}$, the other post of said spark-gap connecting to a terminal $a^{16}$ of the primary $a^7$, the other terminal, $a^{17}$, thereof connecting with the terminals $a^{12}$ $a^{14}$, before mentioned.

The parts having been assembled and connected as above explained, the spark-gap $a^{15}$ being mounted on a partition $b$, are housed in a box B, and the opposite terminals $a^{18}$ $a^{19}$ of the primary $a^2$ of the transformer are connected to binding-posts $a^{20}$ $a^{21}$, a switch $a^{22}$ being interposed in one of said terminals. The terminals $a^{23}$ $a^{24}$ of the secondary $a^9$ of the oscillator or inductor are connected, respectively, to posts $a^{25}$ $a^{26}$, containing the discharge-electrodes for producing the high-frequency discharge desired.

My apparatus thus constructed, and although condensed into the extremely small compass above stated, is capable of producing the usual X-ray effects and ultra-violet light and various other high-frequency phenomena which are required in usual therapeutical practice.

I wish it understood that I am not limited to all the constructional details and arrangements herein set forth, as many variations may be made without departing from the spirit and scope of my invention.

Having described my invention, what I claim as new, and desire to secure by Letters Patent of the United States, is—

1. A high-frequency apparatus consisting of a transformer, condenser, high-frequency-coil primary, and high-frequency-coil secondary, having all of said parts concentrically and compactly arranged.

2. A high-frequency apparatus, consisting of a transformer, condenser, high-frequency-coil primary, and high-frequency-coil secondary, having all of said parts compactly wound in successive concentric layers.

3. A high-frequency apparatus, comprising a transformer, a condenser mounted concentrically thereon, a coarse primary wound outside of said condenser, and a secondary wound outside of said primary.

4. A high-frequency apparatus, comprising a transformer, a condenser mounted concentrically thereon, and a coarse primary mounted concentrically on said condenser, an insulating-tube inclosing said primary, and a secondary wound on said insulating-tube.

5. A high-frequency apparatus, comprising a transformer, a condenser mounted concentrically thereon, an insulating-tube inclosing said condenser, a coarse primary wound on said tube, a second insulating-tube inclosing said primary, and a secondary wound on said outside tube.

6. A high-frequency apparatus, comprising a core, a tube containing the same, a primary wound on said tube, and successively superimposed thereon concentrically, a secondary of fine wire and many turns, a condenser of small area, an insulating-tube, a high-frequency-coil primary, a second insulating-tube, a high-frequency-coil secondary, the terminals of one end of said condenser and said first-mentioned secondary being connected to one pole of a spark-gap, and one terminal of said high-frequency-coil primary being connected to the other pole of said spark-gap, the opposite terminals of said high-frequency-coil primary and of said condenser and of said first-mentioned secondary being connected together.

In testimony whereof I have signed my name to this specification in the presence of two subscribing witnesses.

FREDERICK F. STRONG.

Witnesses:
T. M. STRONG,
GEO. H. MAXWELL.